United States Patent [19]

Watanabe et al.

[11] Patent Number: 4,887,161

[45] Date of Patent: Dec. 12, 1989

[54] MEMORY CARTRIDGE AND DIGITAL ELECTRONIC STILL VIDEO CAMERA IN WHICH SAID MEMORY CARTRIDGE IS FREELY LOADABLE/UNLOADABLE

[75] Inventors: Mikio Watanabe, Tokyo; Koji Shimanuki, Isehara; Seiki Nishi, Tokyo, all of Japan

[73] Assignee: Fuji Photo Film Co., Ltd., Kanagawa, Japan

[21] Appl. No.: 199,705

[22] Filed: May 27, 1988

[30] Foreign Application Priority Data

May 28, 1987 [JP] Japan .................................. 62-129932
May 28, 1987 [JP] Japan .................................. 62-129933
May 28, 1987 [JP] Japan .................................. 62-129934

[51] Int. Cl.$^4$ .............................................. H04N 5/76
[52] U.S. Cl. ..................................... 358/224; 358/909; 358/906
[58] Field of Search ................. 358/209, 909, 44, 224, 358/906; 364/167.1, 900; 360/33.1

[56] References Cited

U.S. PATENT DOCUMENTS

| | | | |
|---|---|---|---|
| 4,420,773 | 12/1983 | Toyoda et al. | 360/33.1 |
| 4,456,931 | 6/1984 | Toyoda et al. | 358/909 |
| 4,471,382 | 9/1984 | Toyoda et al. | 358/909 |
| 4,489,351 | 12/1984 | d'Alayer de Costemore | 358/909 |
| 4,597,058 | 6/1986 | Izumi et al. | 364/900 |
| 4,647,976 | 3/1987 | Nakagaki et al. | 358/909 |
| 4,754,271 | 3/1987 | Edwards | 358/909 |
| 4,758,833 | 10/1983 | Kawahara et al. | 358/44 |
| 4,772,975 | 9/1986 | Azuma | 360/33.1 |

Primary Examiner—Jin F. Ng
Assistant Examiner—Stephen Brinich
Attorney, Agent, or Firm—Birch, Stewart, Kolasch & Birch

[57] ABSTRACT

A memory cartridge having a semiconductor memory for storing digital image data is provided with a D/A converter for converting digital image data read out of the memory into an analog video signal, and a display device for displaying an image represented by this video signal provided in a first embodiment of the present invention. In another embodiment, a memory cartridge having a semiconductor image memory for storing a plurality of frames of digital image data is provided with an image display device and a frame feed switch. Predetermined image data is read out of the image memory and the image represented by the data is displayed on the display device. Displayed images are shifted sequentially in response to imputs from the frame feed switch. Also disclosed is a digital still video camera which includes a memory cartridge having the display device that may be loaded. The camera has an opening which allows an image displayed on the display device to be seen from the outside when the cartridge is loaded in the camera. If the camera is arranged so that a picture just imaged by the camera is displayed on the display device, the user can check whether the desired picture has been properly taken. This arrangement also allows the display device to be utilized as a viewfinder.

8 Claims, 4 Drawing Sheets

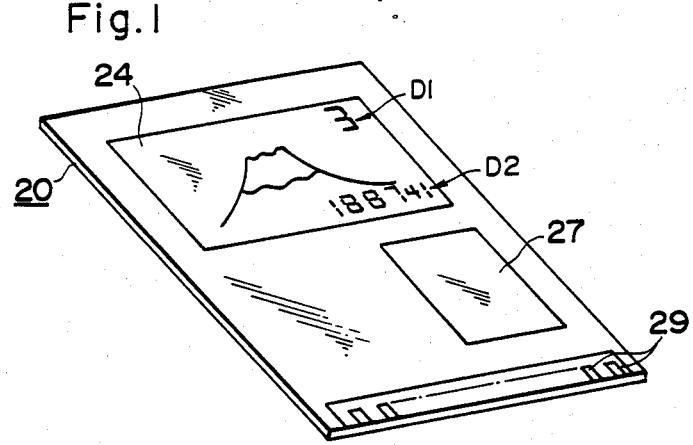
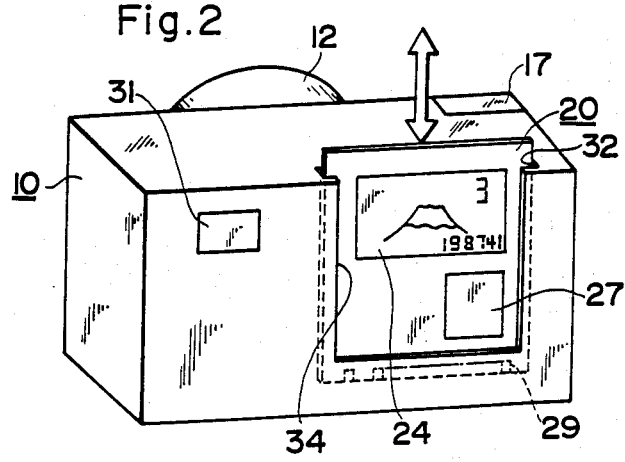
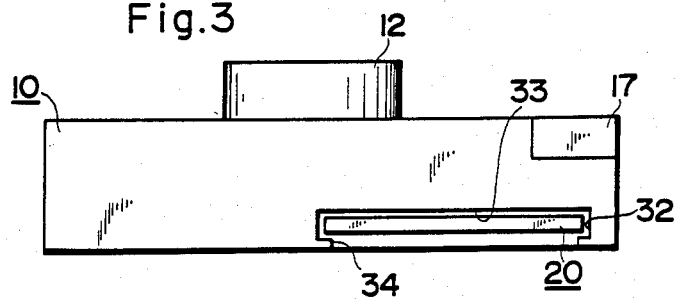

MEMORY CARTRIDGE AND DIGITAL ELECTRONIC STILL VIDEO CAMERA IN WHICH SAID MEMORY CARTRIDGE IS FREELY LOADABLE/UNLOADABLE

BACKGROUND OF THE INVENTION

This invention relates to a memory cartridge having an image memory, particularly a memory cartridge for storing digital image data provided by an digital electronic still video camera, for. example or other image data recording devices.

The invention further relates to a digital electronic still video camera in which a video signal resulting from the imaging of a subject is converted and outputted as digital image data. More particularly, the invention relates to a digital still video camera in which a memory cartridge having an image memory for storing the abovementioned image data is capable of being freely loaded and unloaded.

Electronic still cameras or still video cameras presently available on the market are adapted to frequency-modulate a video signal and store the signal in the form of an analog signal on a magnetic disc that serves as a recording medium. The magnetic disc may be freely rotated and accommodated inside accommodating means referred to as a case or jacket and is capable of recording video signals of images totaling 50 frames. When such a magnetic disc is loaded in a playback apparatus having a CRT display unit and the disc is driven for playback, the video signals that have been recorded on the magnetic disc are played back and displayed on the CRT display unit.

Due to the progress that has recently been made in IC manufacturing techniques, it is now possible to realize semiconductor memory chips of large capacities. Therefore, cartridges capable of digitally storing image data as well as digital still video cameras capable of recording images on these memory cartridges are attracting considerable attention. Since these memory cartridges and digital still video cameras store image data in the form of easily manageable digital signals, a wide variety of new applications can be developed for them.

SUMMARY OF THE INVENTION

An object of the present invention is to provide a memory cartridge which, by exploiting the characteristics of a memory cartridge is capable of displaying stored images. Namely, the ability to manipulate and store digital signals is manipulated.

Another object of the present invention is to provide a memory cartridge capable of displaying a desired stored image.

Still another object of the present invention is to provide a digital electronic still video camera having new and convenient functions in combination with a memory cartridge.

A memory cartridge in accordance with the present invention includes a semiconductor memory for storing digital image data, a D/A converter for converting image data read out of the memory into an analog video signal, and a display device which receives the analog video signal as an input thereto for displaying an image representative of the video signal. The memory cartridge refers to a semiconductor memory accommodated inside a case or cartridge and includes the concept of a memory card.

If the aforementioned memory is volatile, battery power is supplied. It is permissible to adopt an arrangement in which the D/A converter and display unit are supplied with power by the same battery. Since the image displayed on the display device is always viewed in a bright location, a solar battery preferably is used to supply power to the display device. An arrangement can be adopted in which the D/A converter is supplied with power by the same solar battery. In such case, it is sufficient to power the memory cartridge solely with a solar battery providing that the abovementioned memory is non-volatile.

In accordance with the invention, the image data stored in the memory is displayed after being read out and converted into an analog signal. Since the memory cartridge possesses an image data playback function, an image can be played back without separately providing a playback apparatus. This is advantageous for providing a light and simple apparatus.

In another aspect of the invention, a memory cartridge includes a semiconductor image memory capable of storing a plurality of frames of image data in a predetermined sequence, a display device which receives an input of image data read out of the image memory for displaying an image represented by the image data, a frame selection switch for selecting image data to be displayed on the display device, and a controller for reading image data out of the image memory that is selected in response to an input from the frame selection switch and causes the image data to be displayed on the display device.

In accordance with this aspect of the invention, image data stored in the image memory and designated in response to an input from the frame selection switch is read out and applied to the display device in order to be displayed. Since the memory cartridge possesses an image data playback function, an image can be played back without separately providing a playback apparatus. This is advantageous for providing a light and simple apparatus. It is also possible to designate and play back any desired image that is recorded in the image memory.

A digital electronic still video camera according to the invention is characterized in that an opening is formed in the camera at a location where a memory cartridge equipped with a display device is loaded. The opening makes it possible to see a display surface of the display device possessed by the memory cartridge loaded in the camera from the outside.

In accordance with the invention, an image displayed by the display device of the memory cartridge can be seen in a state where the memory cartridge is loaded in the camera. Accordingly, and by way of example, an image resulting from photography performed by the camera can be immediately displayed on the cartridge display device so that the image can confirm whether the desired picture has been taken. It is also possible to develop this concept in such a manner that the cartridge display device is utilized as a viewfinder.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 1 is a perspective view showing the external appearance of a memory cartridge for one embodiment of the present invention;

FIGS. 2 and 3 are perspective and plan views, respectively, illustrating the external appearance of a digital electronic still video camera;

DESCRIPTION OF THE PREFERRED EMBODIMENTS

Figure 4:
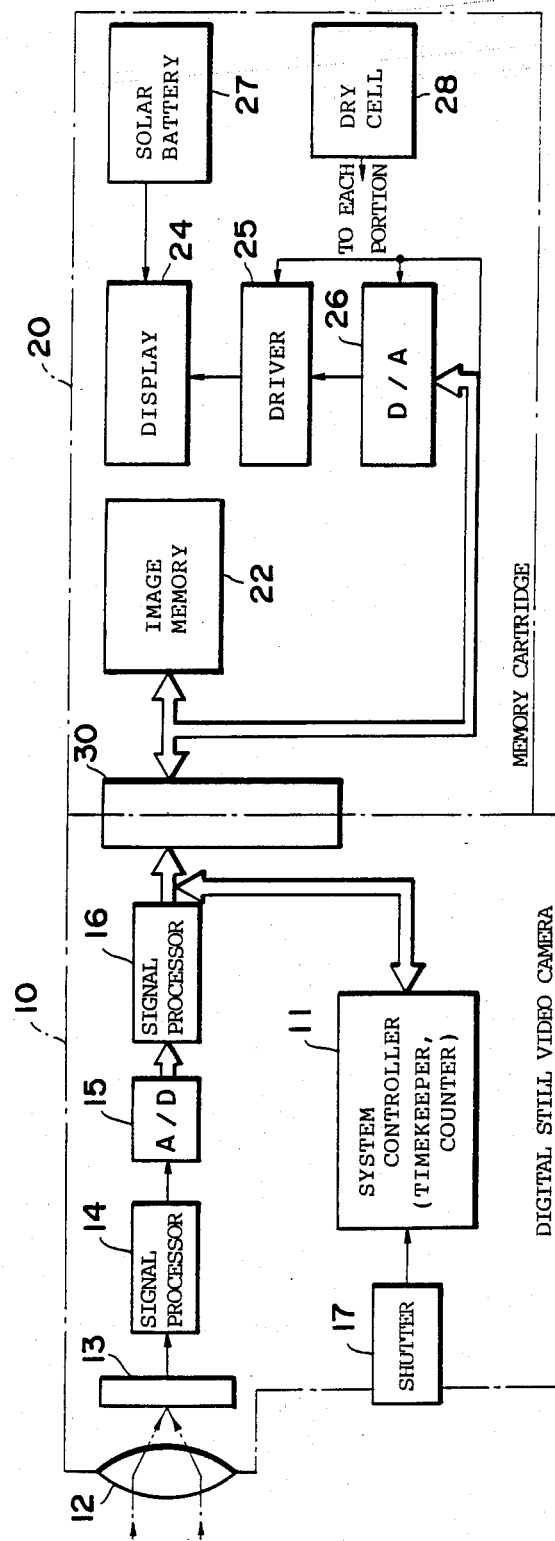
FIG. 4 is a block diagram illustrating an electrical arrangement in which the memory cartridge is loaded in the digital electronic still video camera.

FIG. 1 illustrates the external appearance of a memory cartridge. The memory cartridge, shown by numeral 20, includes a number of terminals 29 for connecting the cartridge to a digital electronic still video camera when the cartridge is loaded in the camera. The terminals 29 are for connecting a data bus, address bus, control lines and the like. A portion of the surface of the memory cartridge 20 is provided with a liquid crystal display device 24. The liquid crystal display device 24 not only displays an image represented by image data stored in a semiconductor image memory (shown by numeral 22 in FIG. 4), described below, but also a number of frames D1 capable of being stored in the image memory, and a date D2 of photography are displayed. It can be arranged for the display device 24 to display a frame number, which indicates the photographic sequence, data indicating the place of photography, and other index information in addition to the abovementioned data. A solar battery 27 for supplying the display device 24 with operating power is disposed on the surface of the memory cartridge 20 provided with the display device 24.

FIGS. 2 and 3 illustrate the external appearance of a digital electronic still video camera in which the above-described memory cartridge is loaded. The camera, designated by numeral 10, has a front side provided with an optical system 12 which includes a lens, a top side where the right-hand corner at the front of the camera is provided with a shutter 17, and a rear side provided with a finder 31 at the upper left corner. The rear side of the camera 10 has a recess 33 for loading the memory cartridge 20. A vertically extending guide groove 32 is formed in both sides of the recess 33. The recess 33 has a back surface defining an opening (shown at numeral 34). As indicated by the arrows in FIG. 2, the memory cartridge 20 is inserted into the recess 33 from the upper side thereof along the guide grooves 32, with the terminals 29 pointing downwardly. To withdraw the memory cartridge 20, the cartridge is extracted by pulling upwardly. Terminals (not shown) are provided on the bottom portion of the recess 33 so as to contact the respective terminals 29 at the lower end of the memory cartridge 20 when the cartridge is loaded.

Since the memory cartridge 20 is inserted into the recess 33, the back side of the recess is defined by the opening 34, by being guided at both sides along the guide grooves 32, an image displayed on the liquid crystal display device 24 can be seen from the outside, as illustrated in FIG. 2, in a state where the memory cartridge 20 is loaded in the camera 10. Furthermore, since the light-receiving surface of the solar battery 27 of the cartridge 20 is also exposed through the opening 34 at the back of the recess 33, ambient light is allowed to impinge upon the light-receiving surface so that the solar battery 27 may generate an electromotive force.

FIG. 4 illustrates an example of an electrical arrangement of the digital electronic still video camera 10 and the memory cartridge 20.

When loaded in the recess 33, the memory cartridge 20 is electrically connected to the digital electronic still video camera 10 by a connector 30. The connector includes the aforementioned terminals 29 on the side of cartridge 20 and the terminals provided on the lower portion of the recess 33 of camera 10.

Photography in the digital electronic still video camera 10, transfer of various data including image data from the memory cartridge 20, and other types of processing are controlled by a system controller 11. The system controller 11 includes a CPU, a ROM for storing the execution program of the CPU, a RAM for storing the required data, a timekeeping device for keeping track of the date and time, and a counter for counting the number of frames and the like.

An image of a subject is focused on an image sensor 13 via the optical system 12, and the image sensor 13 outputs a video signal indicative of the image. After being subjected to the required signal processing such as amplification, exposure adjustment and white balance adjustment by a signal processing circuit 14, the video signal is converted into a digital signal by an A/D converter circuit 15. This digital signal is subjected to further necessary processing, such as separating the digital signal into color components, by a signal processing circuit 16. A data bus on the output side of the signal processing circuit 16 is connected to the connector 30. The address bus, data bus and control lines of the system controller 11 are also connected to the connector 30. A shutter signal from the shutter 17 is applied to the system controller.

The memory cartridge 20 is provided with an image memory 22 for storing digital image data and other display data D1 and D2 received from the digital electronic still video camera 10, a D/A converter 26 for converting the digital image data read out of the image memory 22 into an analog signal, the abovementioned liquid crystal display device 24, a driver circuit 25 which receives the D/A-converted video signal for driving the display device 24 so as to display the image represented by this video signal, the abovementioned solar battery 27, and a dry cell 28 for supplying the image memory 22, driver circuit 25 and D/A converter 26 with operating power. Although it is possible to store a plurality of frames of image data in the image memory 22, in certain cases the memory 22 only need to have the capacity to store a single frame.

The operation of the system shown in FIG. 4 and the effects of the memory cartridge 20 having the display device 24 will now be described with regard to an example in which the memory cartridge 20 is possessed of a function wherein the cartridge 20 having the liquid crystal display device 24 is loaded in the camera 10 so that pictures taken by the camera 10 are immediately displayed on the display device 24 and the desired pictures can be checked.

When the memory cartridge 20 is loaded, the system controller 11 of the camera 10 searches the contents of the image memory 22 and acquires the location of a blank area in the memory and data indication for the number of remaining frames. The number of remaining frames is counted by the abovementioned counter whenever a picture is taken. The fact that the memory cartridge 20 has been loaded in the camera 10 is sensed by a sensor (not shown) that is provided on the camera side.

Photographic processing starts when the shutter 17 is pressed. The image data obtained at such time is applied to the image memory 22 by the signal processing circuit 16 via the connector 30. The system controller 11 provides the image memory 22 with an address signal indicating the address at which the image data is to be written, and a write command, via the connector 30. As a result, the aforementioned image data is stored in the designated location of the memory 22. The system controller 11 also provides the memory 22 with data indicating the remaining number of frames, the frame number data and the date. These data items are stored in the image memory 22 in a manner similar to the above described manner.

Next, the controller 11 provides the memory cartridge 20 with a read command and a display control signal via the connector 30. As a result, the written image data mentioned above is read out of the memory 22 so that the D/A converter 26 and the driver circuit 25 begin operating, whereby the picture taken is displayed on the display device 24. The remaining number of frames D1 and the date D2 are also displayed at this time.

When the operator observes the display and decides that the display contains the picture desired, the image data is stored in the memory 22. If the operator considers that the image is improper, on the other hand, the operator presses a cancel push-button (not shown) on the camera 10 so that a cancel input is applied. Whereupon, the system controller 11 erases the corresponding image data from the image memory 22.

In the example described above, control of the display in the memory cartridge 20 is carried out by the system controller 11 of the camera 10. However, as will be described later, it is permissible to provide the memory cartridge 20 with a CPU and have this CPU execute display control. It is also possible to provide the memory cartridge 20 with a display buffer memory (indicated by numeral 24A in FIG. 7), apply image data directly to the buffer memory and display the data upon reading it out of the buffer memory. In accordance with an input indicating that the recording is acceptable, the image data in the buffer memory is stored in a predetermined area of the image memory 22.

The memory cartridge 20 can be used as a view finder. In such a case, the image data indicative of the inputted subject is arranged to be applied to the abovementioned display buffer memory (numeral 24A in FIG. 7) of memory cartridge 20 at all times for constantly displaying the image data on the display device 24. When the shutter 17 is pressed, the image data in the buffer memory is stored in a predetermined area of the image memory 22.

Also, an image may be arranged to be displayed on the display device 24 even after the memory cartridge is extracted from the camera 10. If the driver circuit 25 and the D/A converter 26 are of the free-running type, then once a command is applied by the system controller 11, an image will continue to be displayed on the display unit 24 even if the memory cartridge 20 is extracted from the camera 10. If necessary, it is possible to adopt an arrangement in which a CPU is built in the memory cartridge 20 so that the CPU is made to execute display control. Further, as will be described later, if the memory cartridge 20 is provided with a frame advance switch and the abovementioned CPU responds to an input from this switch so as to successively change the image data read out of the image memory 22, then a desired image stored in the image memory 22 can be displayed on the display unit 24.

If an arrangement is adapted wherein a desired image is thus displayed on the display unit 24 even if the memory cartridge 20 has been extracted from the camera 10, the memory cartridge can be used as a portrait placed on a desk top, or as an ID card bearing the image of the possessor. Various other applications are also possible.

It is also possible to adopt an arrangement in which the image displayed on the display device 24 is all or only part of the picture actually taken by the camera.

In the above-described embodiment, the memory cartridge is arranged to be connected to a digital electronic still video camera, on other recording apparatus or a playback apparatus by means of electrical contacts. However, an arrangement is feasible in which the connection is made by photocoupling or magnetic coupling.

Figure 5:
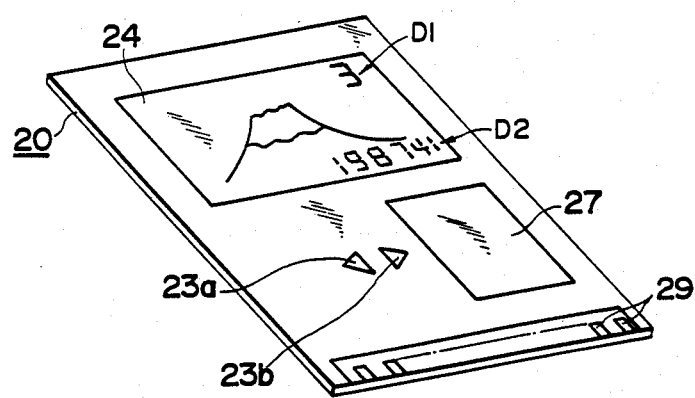
FIG. 5 is a perspective view showing the external appearance of a memory cartridge for a second embodiment of the present invention.
Figure 6:
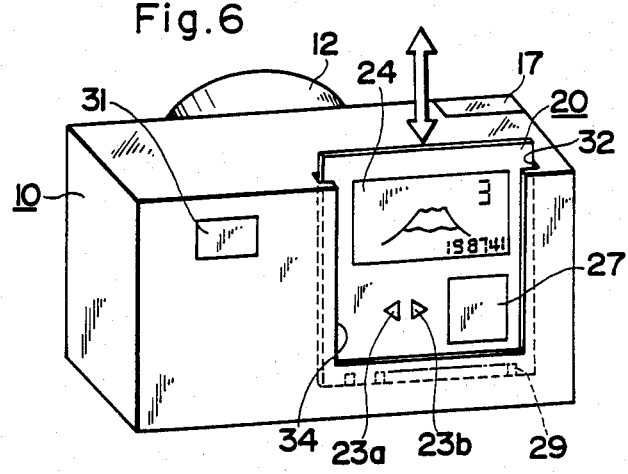
FIG. 6 is a perspective view illustrating the external appearance of a digital electronic still video camera.
Figure 7:
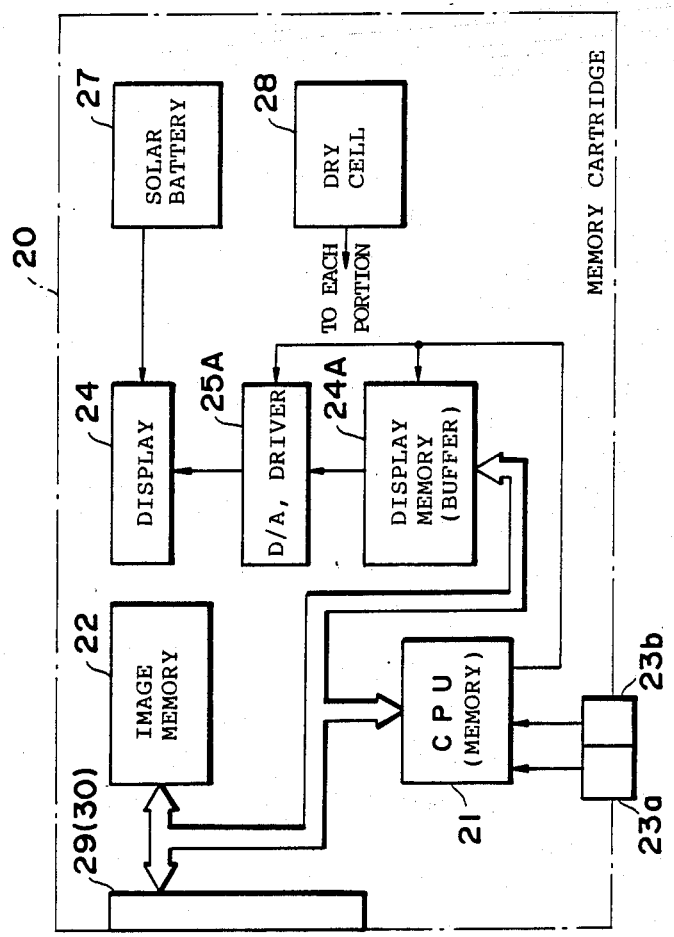
FIG. 7 is a block diagram illustrating an electrical arrangement of the memory cartridge.

FIGS. 5 through 7 illustrates another embodiment of the present invention. Portions identical with those shown in FIGS. 1 through 4 are designated by like reference characters and need not be described again.

In this embodiment, the memory cartridge 20 further includes a forward-feed switch 23a for feeding frames of images to be displayed in a forward direction, and a reverse-feed switch 23b for feeding frames of images to be displayed in a reverse direction. Digital data indicative of a plurality of image frames are stored in the image memory 22 together with the display data D1 and D2 in accordance with a fixed sequence (e.g. the order in which pictures are taken). Pressing the forward-feed switch 23a causes the next image in the abovementioned sequence, namely the image following the presently displayed image, to be read out of the memory 22 and displayed on the display device 24. Pressing the reverse-feed switch 23b causes the image which is one frame earlier in the sequence to be read out of the memory 22 and displayed on the display unit 24. The display D1 on the display device 24 is the number of frames capable of being stored in the image memory 22 or a frame number indicating the order in which the pictures are taken.

The image memory 22 has a capacity for storing a plurality of frames of digital image data. When this memory cartridge 22 is loaded in an image recording apparatus such as the above-described digital electronic still video camera, the cartridge 20 is electrically connected to the image recording apparatus via a connector 29 (30). The image data and the data for the abovementioned displays D1 and D2 received from the image recording apparatus are stored one frame at a time in accordance with a fixed sequence (e.g. an inputted sequence or the sequence of the frame numbers) in a predetermined area of the image memory 22.

The memory cartridge 20 further includes a display buffer memory 24A for temporarily storing digital image data read out of the image memory 22 so that the image data may be displayed, the above-mentioned liquid crystal display device 24, a driver circuit 25A which includes D/A converter for converting the digital image data into an analog video signal, the abovementioned forward- and reverse- and reverse-feed switches 23a and 23b, a CPU (which includes a memory for storing a program) 21 for display control including frame-feed control that is performed in response to inputs from the switches 23a and 23b, the abovementioned solar battery 27, and a dry cell 28 for supplying the image memory 22, the display buffer memory 24a, the driver circuit 25A and CPU 21 with operating power. Depending on the type of display device, the driver circuit 25A does not necessarily need to be provided with the D/A converter.

The memory cartridge 20 possesses a function in which, when the cartridge is loaded in the camera 10, pictures taken by the camera 10 are allowed to be immediately displayed on the display device 24 so that the desired pictures can be checked.

When the memory cartridge 20 is loaded, the system controller 11 (see FIG. 4) of the camera 10 searches the contents of the image memory 22 and acquires the location of a blank area in the memory and data including the number of remaining frames or the next frame number. The number of remaining frames or the frame number is counted by the abovementioned counter whenever a picture is taken. As in the foregoing embodiment, the image data resulting from photography performed by the camera 10 is sent to the memory cartridge 20 via the connector 30 together with the data indicative of the number of frames, the frame number data, the date data and the like. These items of data are stored at a predetermined storage location in the image memory 20.

Next, the controller 11 provides the CPU 21 of the memory cartridge 20 with a display command. As a result, the CPU 21 reads written image data out of the memory 22, writes the data in the display memory 24A and starts the operation of the driver circuit 25A. Thus, the picture taken is displayed on the display device 24. The remaining number of frames or the frame number D1 and the date D2 are also displayed at this time.

When the operator observes the display and decides that the display is the picture desired, the image data is stored in the memory 22. If the operator considers that the image is improper, on the other hand, the operator presses a cancel push-button (not shown) on the camera 10 for applying a cancel input. Whereupon, the system controller 21 or CPU 21 erases the corresponding image data from the image memory 22.

In the example described above, control of the display in the memory cartridge 20 is carried out by the CPU 21 inside the cartridge 20. However, it is possible to adopt an arrangement in which display control is performed by the controller 11 of the camera 10. It is also possible to directly apply the image data of the picture taken by the camera to the display buffer memory 24A. In accordance with an input indicating that the recording is acceptable, the image data in the buffer memory 24A is stored in a predetermined area of the image memory 22.

It is also possible to adopt a method of use in which the memory cartridge shown in FIGS. 5 and 7 causes a desired image stored in the image memory 22 to be selectively displayed on the display device 24.

When one input signal is provided by the forward-feed switch 23a, the CPU 21 goes to the image memory 22 for reading out image data corresponding to the frame following (in the abovementioned sequence) the image being presently displayed, transferring this image data to the display buffer memory 24A and applying an operate command to the driver circuit 25A. As a result, the next frame of image data is displayed on the display device 24. When an input is received from the reverse-feed switch 23b, the CPU 21 reads out image data which is one frame earlier in the abovementioned sequence than the image being presently displayed and exercises control so that the data is displayed on the display device 24 in a manner similar to the above described manner. By operating the frame feed switches 23a and 23b, the operator can successively shift the displayed image in forward or reverse directions.

Such a display of an image can be performed when the memory cartridge has been loaded and extracted from the image recording apparatus (camera, etc.). If necessary, the memory cartridge 20 can be provided with a power supply switch, and the display of an image can be performed only when the switch is closed. It is also possible to adopt an arrangement in which the image having the smallest frame number is displayed automatically when the power supply switch is closed.

The power from the dry cell 28 can be arranged to be applied solely to the CPU 21 and the image memory 22, with the other circuits 24, 24A and 25A being operated by the solar battery 27. If the image memory 22 is non-volatile, power need not be supplied to the memory when the memory is inoperative.

Thus, the memory cartridge 20 is not only a recording medium for image data but also functions as a playback device. This is convenient in that the image playback can be performed in a simple fashion without loading the memory cartridge in a separately provided playback apparatus.

It is also possible to adopt an arrangement in which the image displayed on the display device 24 is all or only a part of one frame of a picture actually taken by the camera.

As mentioned earlier, the above-described memory cartridge can be used as a portrait placed on a desk top, or as an ID card bearing the image of the processor. Various other applications are also possible.

Frame selection switches are not limited to the abovementioned forward-feed and reverse-feed switches. For example, it is possible to employ numeric keys capable of designating a frame number, or an automatic feed switch for advancing frames one after another at a fixer timer interval.

Many apparent and widely different embodiments of the present invention can be made without departing from the spirit and scope thereof, it is also to be understood that the invention is not limited to the specific embodiments thereof except as defined in the appended claims.

What is claimed is:

1. An apparatus for storing and displaying an image, comprising:
   a digital still video camera for developing digital video signals representative of the image; and
   a cartridge for storing and displaying said digital video signals of the image including,
   connection means for selectively connecting said cartridge to said digital still video camera,
   memory means for storing said digital video signals of the image received through said connection means,
   converting means for converting said digital video signals of the image from said memory means to analog video signals, display means for displaying the image responsive to said analog video signals, and power means for supplying power to said cartridge.

2. An apparatus according to claim 1, wherein said memory means comprises a semiconductor memory.

3. An apparatus according to claim 1, wherein said power means comprises a solar battery for driving said display means.

4. An apparatus for storing a plurality of frames of image data and selectively displaying an image corresponding to one of the plurality of frames of the image data, comprising:
- a still video camera for developing the image data; and
- a cartridge for storing a plurality of frames of image data in a predetermined sequence and selectively displaying one of the plurality of frames including,
    connection means for selectively connecting said cartridge to said still video camera,
    memory means for storing the plurality of frames in said predetermined sequence,
    frame selection means for selecting the image data corresponding to one of the plurality of frames,
    control means for reading the image data of said one frame from said memory means in response to said frame selection means,
    display means for displaying the image data of said one frame, and
    power means for supplying power to said cartridge.

5. An apparatus according to claim 4, wherein said power means comprises a solar battery for driving said display means.

6. An apparatus according to claim 4, wherein said memory means comprises a semiconductor memory.

7. An apparatus according to claim 4, wherein said frame selection means comprises a frame feed switch for shifting the plurality of frames of image data displayed on said display means sequentially in a forward direction or reverse direction of said predetermined sequence.

8. An apparatus for storing and displaying an image, comprising:
- a still video camera for developing video signals representative of the image; and
- a cartridge for storing and displaying said video signals of the image including,
    connection means for selectively connecting said cartridge to said still video camera,
    memory means for storing said video signals of the image received through said connection means,
    display means for displaying the image in response to said video signals being read from said memory means, and
    power means for supplying power to said cartridge;
- said still video camera having means for loading said cartridge, said means for loading said cartridge having an opening for viewing said display means of said cartridge.

* * * * *